US00RE39228E

(19) United States
(12) Reissued Patent
Claxton, III et al.

(10) Patent Number: US RE39,228 E
(45) Date of Reissued Patent: Aug. 8, 2006

(54) FIELD-SERVICEABLE SOLIDS-HANDLING VERTICAL TURBINE PUMP

(75) Inventors: Ernest J. Claxton, III, Flowery Branch, GA (US); Eugene F. Poser, Toccoa, GA (US)

(73) Assignee: Patterson Pump Co., Toccoa, GA (US)

(21) Appl. No.: 09/034,313

(22) Filed: Mar. 4, 1998

Related U.S. Patent Documents

Reissue of:
(64) Patent No.: 5,496,150
Issued: Mar. 5, 1996
Appl. No.: 08/321,857
Filed: Oct. 14, 1994

(51) Int. Cl.
*F04D 11/00* (2006.01)
*F04D 29/04* (2006.01)

(52) U.S. Cl. ..... 415/229; 415/901; 415/219.1
(58) Field of Classification Search ..... 415/210.1, 415/211.2, 218.1, 219.1, 221, 222, 229, 901; 417/423.12, 424.1; 384/276, 295
See application file for complete search history.

(56) References Cited

U.S. PATENT DOCUMENTS

| | | | | | |
|---|---|---|---|---|---|
| 1,028,564 | A | * | 6/1912 | Forward | |
| 1,817,892 | A | * | 8/1931 | Claus | 384/295 |
| 2,540,968 | A | | 2/1951 | Thomas | |
| 2,933,893 | A | | 4/1960 | Blyth et al. | |
| 3,071,691 | A | | 1/1963 | Haddad et al. | |
| 3,170,646 | A | | 2/1965 | Springer | |
| 3,249,057 | A | | 5/1966 | Callahan | |
| 3,398,694 | A | * | 8/1968 | Lerch | |
| 3,620,639 | A | * | 11/1971 | Gaffal et al. | |
| 3,652,179 | A | * | 3/1972 | Hagen | |
| 3,881,841 | A | | 5/1975 | Straniti | |
| 4,034,560 | A | | 7/1977 | Chute et al. | |
| 4,063,849 | A | * | 12/1977 | Modianos | |
| 4,073,606 | A | | 2/1978 | Eller | |
| 4,417,850 | A | * | 11/1983 | Hacker et al. | 415/229 |
| 4,487,557 | A | * | 12/1984 | Ruyak et al. | 415/229 |
| 4,523,900 | A | | 6/1985 | Frey | |
| 4,784,499 | A | * | 11/1988 | Fukute | 384/295 |

FOREIGN PATENT DOCUMENTS

| | | | | |
|---|---|---|---|---|
| DE | 1453758 | * | 2/1969 | 415/218.1 |
| DE | 2421237 | * | 1/1975 | |
| FR | 614622 | * | 12/1926 | 415/901 |
| GB | 1016097 | * | 1/1966 | |
| GB | 257111 | * | 8/1986 | |
| IT | 361209 | * | 7/1938 | |

OTHER PUBLICATIONS

Lazarkiewicz, Stephen. Impeller Pumps. Permagon Press, pp. 213,217 (translated from 1965 publication).*
Fairbanks Morse Pump Corporation. VTSH Vertical Turbine Solids Handling Pumps, pp. 37–38, 1992.*
Dicmas, John L. Vertical Turbine, Mixed Flow, and Propeller Pumps, pp. 280–323. McGraw–Hill Book Company, 1987.*

* cited by examiner

*Primary Examiner*—Christopher Verdier
(74) *Attorney, Agent, or Firm*—Birch, Stewart, Kolasch & Birch, LLP

(57) ABSTRACT

A vertical turbine pump which operates with its inlet submerged in a body of liquid to be pumped employs an impeller provided with two or three equiangularly spaced vanes and a diffuser section provided with three equiangularly spaced stationary vanes. A vertical turbine pump incorporating such a combination of impeller and diffuser vanes exhibits favorable hydraulic efficiency and smooth operation and can effectively handle liquids with entrained solids. The pump bowl bearings are part of a cartridge which is readily removed and installed through the upstream end of the pump to facilitate servicing in the field.

22 Claims, 6 Drawing Sheets

FIELD-SERVICEABLE SOLIDS-HANDLING VERTICAL TURBINE PUMP

Matter enclosed in heavy brackets [ ] appears in the original patent but forms no part of this reissue specification; matter printed in italics indicates the additions made by reissue.

BACKGROUND OF THE INVENTION

The present invention relates to a vertical turbine pump and more particularly to such a pump which is resistant to clogging when handling fluids with entrained stringy materials and other solids.

Vertical turbine pumps are well known which operate in an upright position and employ a bowl assembly including a rotary impeller submerged in a body of liquid to be pumped. In these pumps, the impeller develops a diverging tangential flow of the liquid which passes through a bulbous diffusion zone and then through a discharge conduit and elbow.

When a vertical turbine pump is employed for pumping sewage and other liquids having considerable amounts of entrained stringy materials and other solids, clogging of the pump can be a problem. To avoid clogging, careful attention must be given to the size and shape of the passages in the impeller and in the downstream components of the pump. Generally, clog-resistant performance is realized by making the passages as large and as streamlined as possible.

A vertical turbine pump which can effectively handle liquids with entrained stringy materials and other solids is disclosed in U.S. Pat. No. 4,063,849 which issued to Modianos. The Modianos pump incorporates a bowl assembly having a fully shrouded two-vane impeller, a diffusion zone provided with two symmetrically disposed stationary vanes and a discharge column and elbow provided with an axially extending "splitter" vane.

When compared to vertical turbine pumps employing greater numbers of impeller and diffuser vanes, a vertical turbine pump having just two impeller vanes and two diffuser vanes exhibits limited hydraulic efficiency and generates significant pressure pulses which are manifested by relatively rough operation.

Vertical turbine pumps constructed according to known designs employ a pump bowl assembly having bowl bearings which are only accessible after completely disassembling the pump. Because of their location in the lower region of the pump, the bowl bearings are particularly vulnerable to wear and degradation when handling sewage and other corrosive and grit-laden liquids. Of the drive shaft bearings employed in a vertical turbine pump, the bowl bearings are usually the first to require servicing. In known vertical turbine pumps, the disassembly of the pump which is required in order to access the bowl bearings makes servicing of the bearings in the field a difficult prospect.

SUMMARY OF THE INVENTION

Accordingly, a primary object of the present invention is to provide a vertical turbine pump which can effectively handle solids-laden liquids and also exhibit favorable hydraulic efficiency.

Another object of the present invention is to provide a vertical turbine pump which can handle solids-laden liquids without the pressure pulsations and accompanying rough operation exhibited by vertical turbine pumps employing fewer numbers of impeller and diffuser vanes.

Still another object of the present invention is to provide a solids-handling vertical turbine pump having bowl bearings which can be readily serviced in the field.

The foregoing and other objects of the present invention are realized by a vertical turbine pump comprising: a pump bowl assembly including a casing having a bulbous diffuser section between relatively narrow axially opposed upstream and downstream sections: a rotary impeller disposed in said casing upstream section adjacent a fluid inlet, said impeller incorporating flared shrouds which are axially spaced from each other and spirally oriented impeller vanes disposed between said shrouds and spaced from each other equiangularly about the axis of impeller rotation; a bulbous diffuser core disposed centrally in said casing diffuser section; and three stationary diffuser vanes spaced equiangularly about said diffuser core, said diffuser vanes extending laterally between said diffuser core and said casing and having upstream ends which curve about said diffuser core and downstream ends which extend generally axially through said casing downstream section.

The objects of the invention are also realized by a vertical turbine pump incorporating a pump bowl assembly including a casing having a bulbous diffuser section between relatively narrow axially opposed upstream and downstream sections, a bulbous diffuser core disposed centrally in said casing diffuser section, a drive shaft extending centrally and axially through said diffuser core and a rotary impeller fastened to an end of said drive shaft and disposed in said casing upstream section adjacent a fluid inlet, a bearing cartridge separably fastened within said diffuser core and said bearing cartridge carrying axially spaced bearings which surround and rotatably support said drive shaft.

The detailed description which follows will reveal the further scope of the present invention. However, it should be understood that the detailed description and specific examples are illustrative only, and various changes and modifications within the spirit and scope of the invention may become apparent to persons skilled in the art who have had the benefit of this disclosure.

BRIEF DESCRIPTION OF THE DRAWINGS

The accompanying drawings are provided by way of illustration only and should not be regarded as limiting the scope of the present invention.

DESCRIPTION OF PREFERRED EMBODIMENTS

Figure 1:
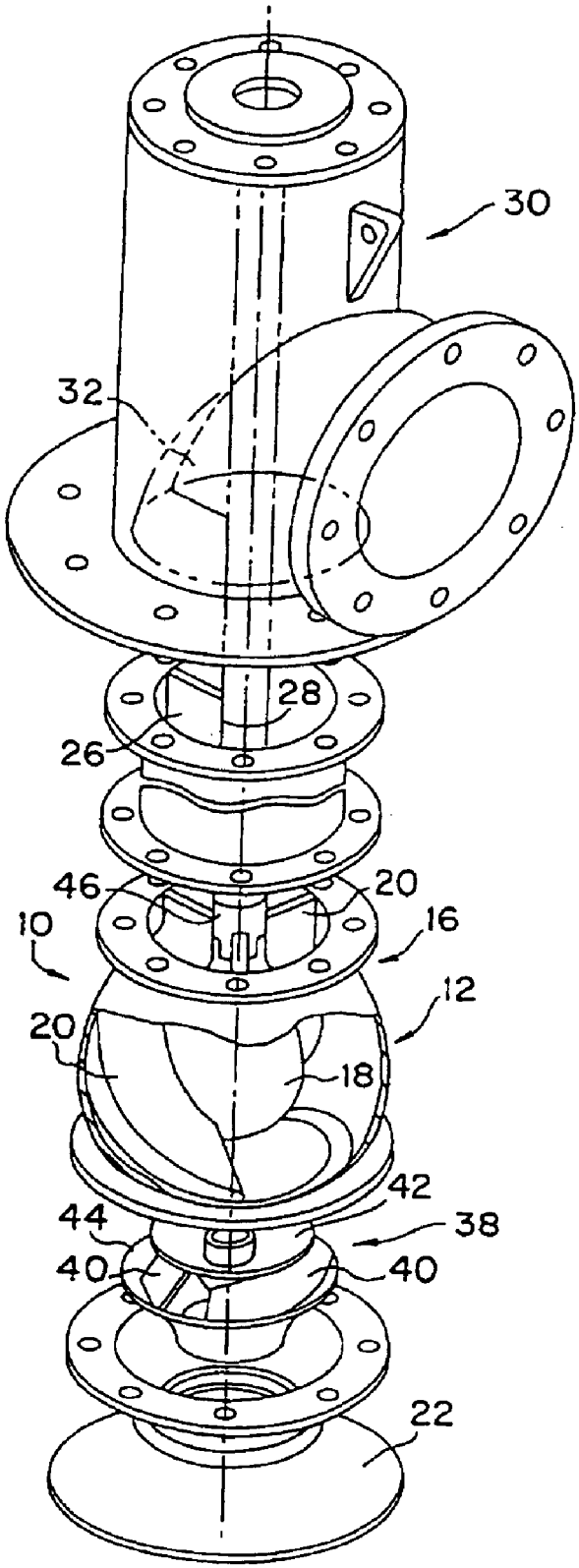
FIG. 1 is an exploded view showing the assembly of the components employed in the vertical turbine pump of the present invention.
Figure 2:
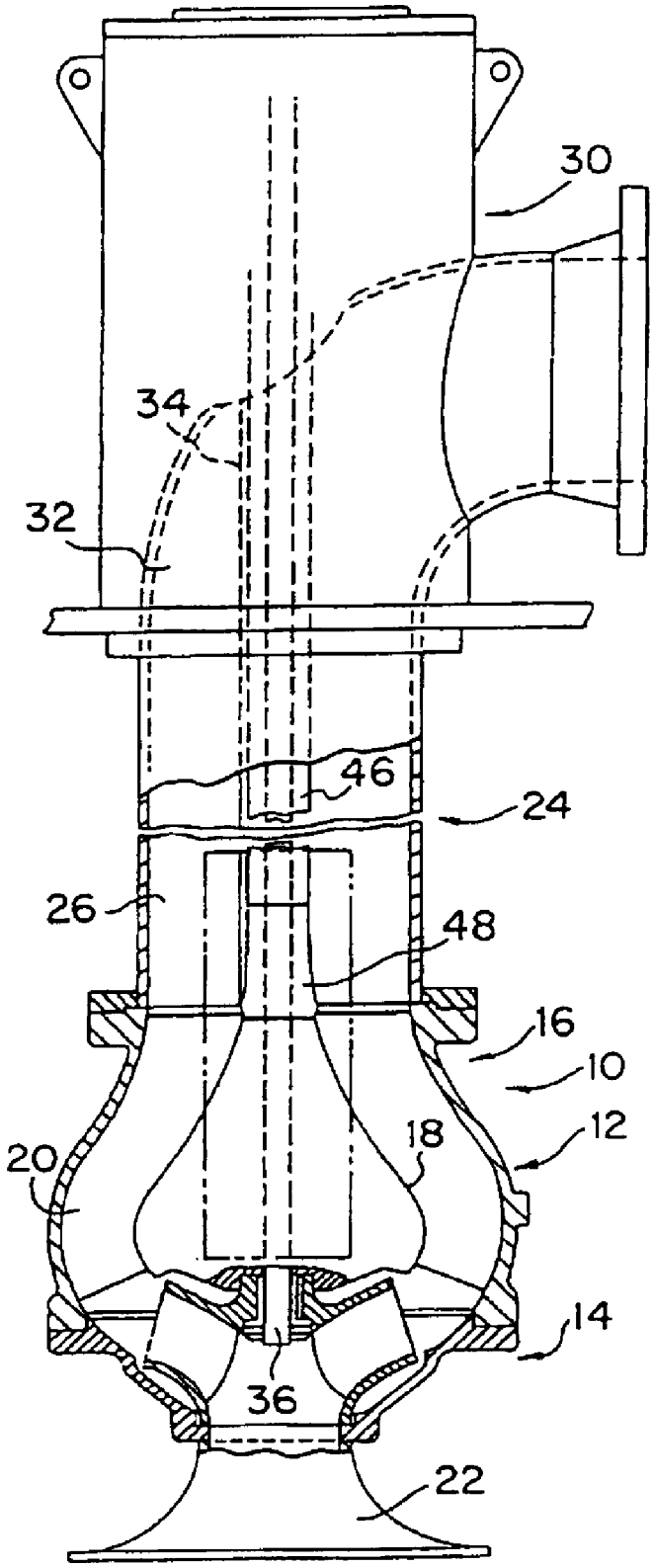
FIG. 2 is a cross-section in elevation of the assembled pump illustrated in FIG. 1.

Referring to FIGS. 1 and 2, the illustrated vertical turbine pump, shown in its upright working position, comprises a bowl assembly 10 including a casing having a bulbous diffuser section 12 located between axially opposed relatively narrow upstream and downstream sections 14 and 16, respectively. Located centrally within the casing diffuser section is a bulbous, acorn-shaped, diffuser core 18. Three stationary diffuser vanes 20 extend laterally between the diffuser core and the inner wall of the casing diffuser section. The diffuser vanes are spaced equiangularly about the diffuser core and have upstream ends which curve about the diffuser core and generally axially extending downstream ends. A suction bell 22 is fastened to the casing upstream section.

A discharge conduit 24 fasten to the casing, forming a continuation of the casing upstream section, and incorporates a vane 26 which projects radially into the discharge conduit and extends axially along the direction of flow. This vane is aligned with the downstream end of one of the diffuser vanes and is joined to an interior surface of the discharge conduit. The vane 26 has an interior edge 28 disposed along a central region of the discharge conduit. The discharge conduit may comprise a single conduit or conduit sections which are fastened together. The length of the discharge conduit is chosen to accommodate the particular installation of the pump.

Fastened to the discharge conduit is a discharge elbow 30 incorporating a vane 32 which is aligned with the vane 26 in the discharge conduit. The vane 32 is joined to the interior surface within the outer bend of the discharge elbow and has an interior edge 34 aligned with the interior edge 28 of vane 26 in the discharge conduit.

Incorporated into the discharge elbow are a support for the pump drive motor and a bearing and seal assembly (not shown) for the upper end of the pump drive shaft.

Figure 4:
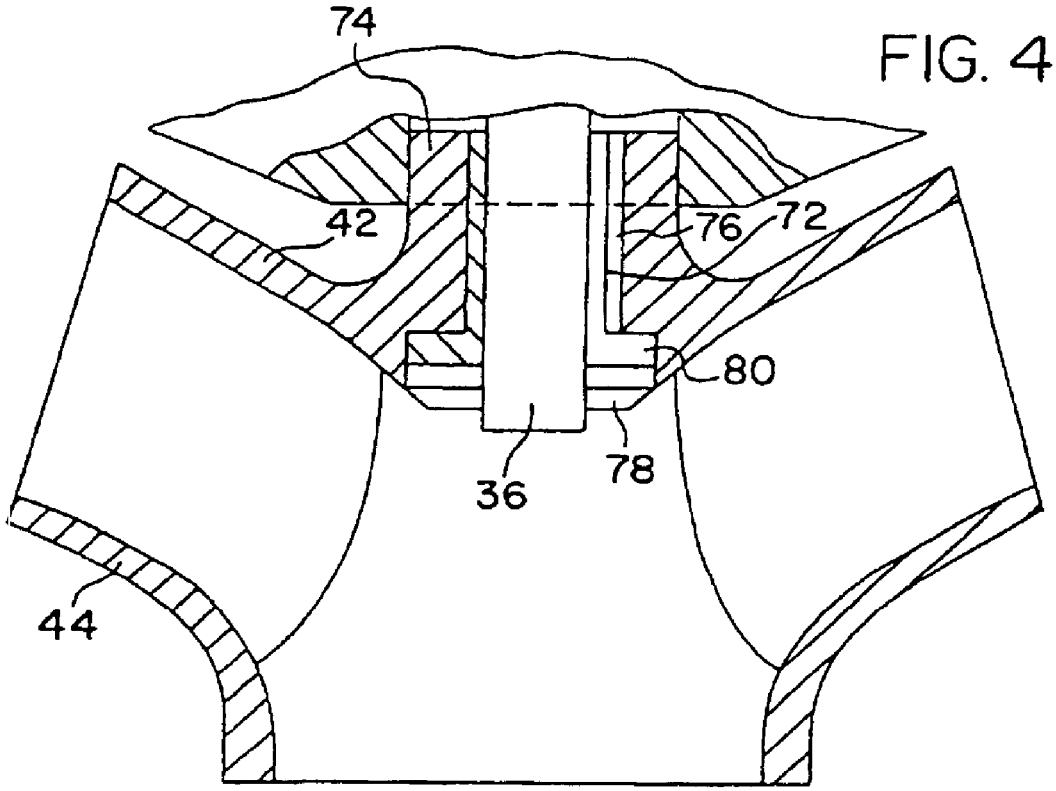
FIG. 4 is a cross-section in elevation of the impeller of the pump illustrated in FIG. 1.
Figure 5:
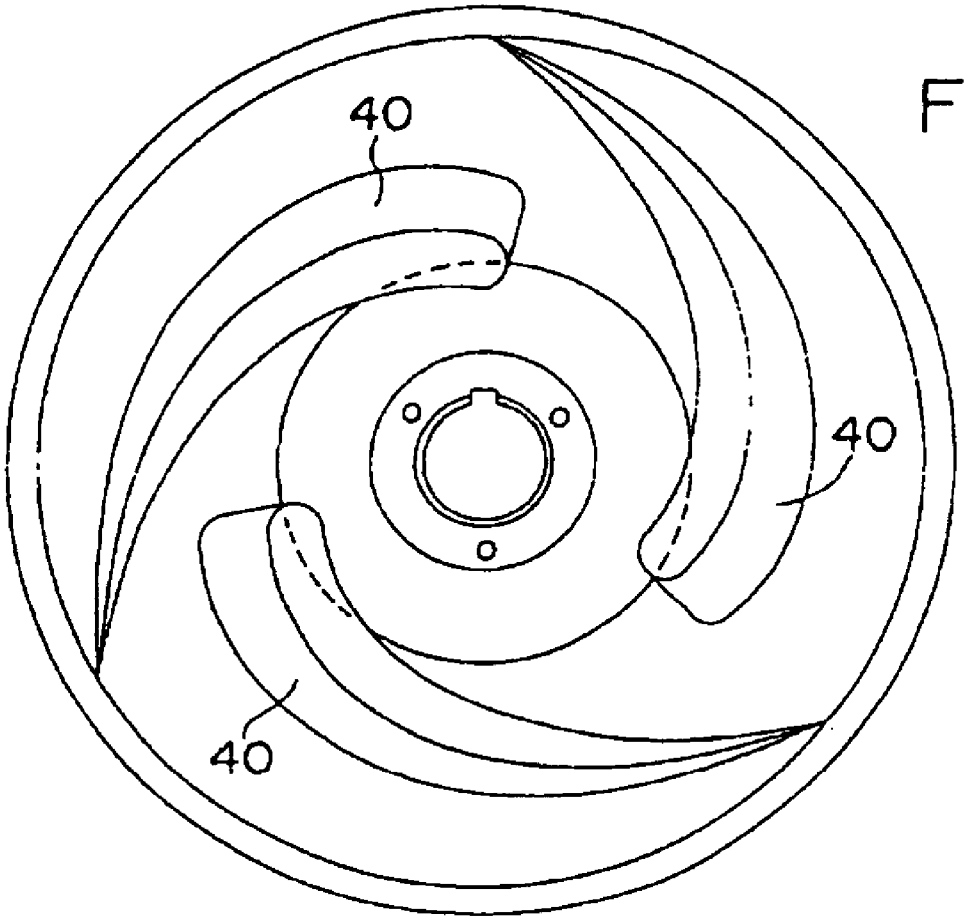
FIG. 5 is a cross-section in plan of the impeller of the pump illustrated in FIG. 1.

The pump drive shaft 36 extends centrally and axially through the discharge elbow, the discharge conduit and the diffuser core. The lower end of the drive shaft carries an impeller 38 which is disposed beneath the diffuser core within the casing upstream section 14. As shown in FIGS. 4 and 5, the impeller incorporates three spirally oriented vanes 40 arranged equiangularly about its axis of rotation and between inner and outer upwardly and outwardly flared shrouds 42, 44.

As best shown in FIG. 2, a tubular shroud 46 extends centrally and axially through the discharge elbow 30 and discharge conduit 24 and encloses the drive shaft. At its upper end the tubular shroud is supported in the discharge elbow. At its lower end, the tubular shroud abuts the upper end of a tubular adapter 48 which engages a surface formed at the top of the diffuser core. An externally threaded connector bearing 50 joins the adjacent interiorly threaded ends of the tubular shroud and the tubular adapter. Within the discharge elbow and discharge conduit, the tubular shroud extends closely adjacent to the interior edges 28, 34 of the vanes 26, 32, respectively. Intermediate bearings (not shown) may be provided within the tubular shroud to afford added support to the drive shaft if needed. If a tubular shroud made up of sections is used, these bearings may be externally threaded like lower connector bearing 50 in order to serve as couplings for the internally threaded ends of adjacent tubular shroud sections.

Figure 3:
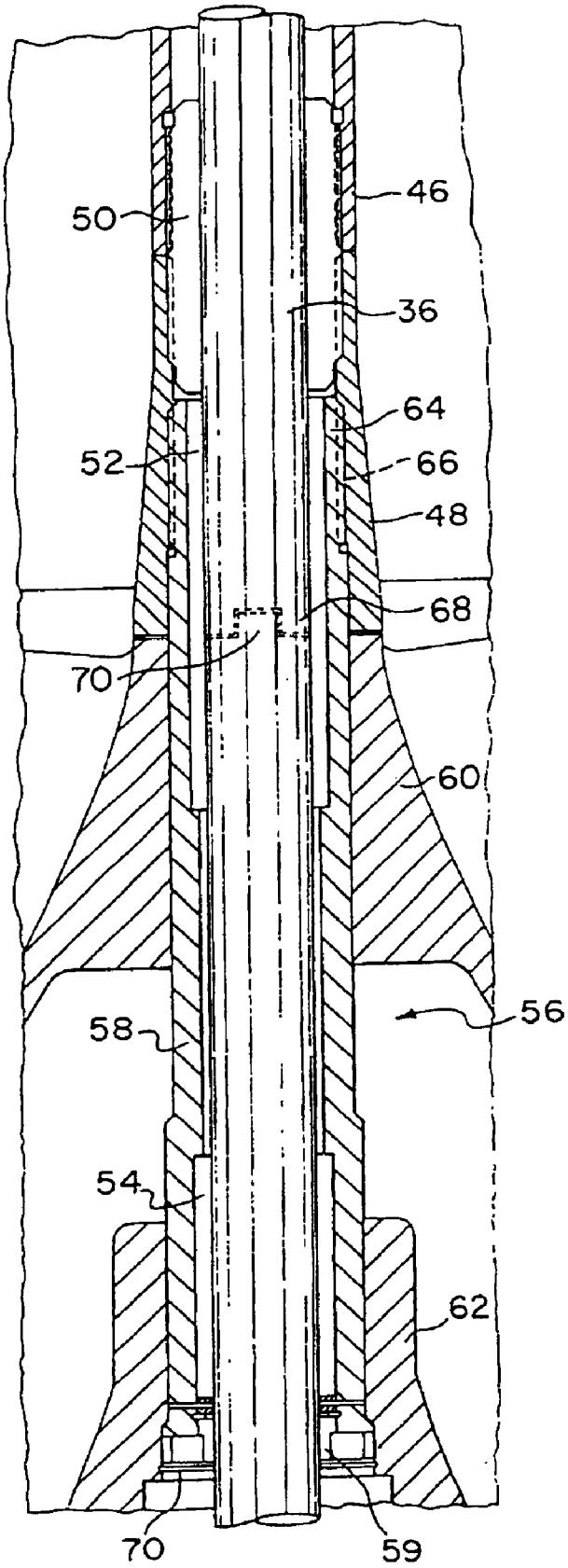
FIG. 3 is a cross-section showing details of the diffuser core, bearing cartridge, tubular adapter and drive shaft of the assembled pump illustrated in FIG. 1.

As illustrated in FIG. 3, a pair of axially spaced bearings 52, 54 within the diffuser core surround and rotatably support the drive shaft. These bearings are part of a bearing cartridge 56 which comprises a tubular housing 58 surrounding the drive shaft. The bearings, which may be metal or elastomeric sleeves, are fixed within the tubular housing by pressing, for example. The tubular housing fits closely within upper and lower formations 60, 62 provided within the diffuser core. Threads 64 formed on the upper end of the tubular housing engage with threads 66 formed within the tubular adapter to secure the tubular housing within the diffuser core. To effect axial alignment and prevent relative rotation between the tubular adapter and the diffuser core during installation or removal of the bearing cartridge, mating formations such as circumferentially spaced lugs 68, 70 may be provided on the abuting end surfaces of the tubular adapter and the diffuser core. Other means may be employed for securing the bearing cartridge within the diffuser core. For example, the tubular housing might carry threads which directly engage threads tapped into the upper or lower formations 60, 62 within the diffuser core. Or, the tubular housing might be threaded within an adapter pressed into the upper formation 60 within the diffuser core; this adapter could also secure the lower end of the tubular shroud. A retaining ring 70 may be employed in the lower formation of the diffuser core to prevent dislodgement of the tubular housing downwardly through the diffuser core.

To lubricate the bearings in the cartridge, water may be introduced through the bearing and seal assembly at the upper end of the pump drive shaft and into the tubular shroud. Alternatively, oil or grease may be introduced through a bore (or bones) in one or more of the diffuser vanes into the interior of the diffuser core and through a passage (or passages) extending through the sidewall of the tubular housing of the bearing cartridge. To accommodate flow of a viscous lubricant, radial passages may be formed through the bearings in alignment with passages in the tubular housing.

A formation, of circumferentially spaced lugs 59, for example, may be provided at the lowermost end of tubular housing 58 for engagement with a mating formation on the end of a special tool to facilitate turning of the tubular housing during removal or installation of the bearing cartridge.

As best shown in FIG. 4, the lower end of the drive shaft is joined to the impeller by means of a split tapered bushing 72. The taper of a bore within impeller hub 74 matches the externally tapered surface of the bushing. A key 76 fits within the slot in the bushing and keyways formed in the drive shaft and the impeller hub. Bolts (not shown) extend through openings in a flange of the bushing and into the impeller hub. Other openings in the flange may be tapped to accommodate jacking screws which van be used to forcibly separate the bushing and impeller hub. To reduce exposure of the joint between the drive shaft and the impeller hub to the pumped liquid and inhibit corrosion which might impede disassembly of the joint, an elastomeric sealing washer 78 is tightly fitted into the annular space between the end of drive shaft 36 and the counterbore 80 in the impeller hub 74. Preferably, grease is applied to the joint prior to installing the sealing washer to provide an additional barrier between the joint and the pumped liquid.

In a typical installation, the vertical turbine pump of the present invention would be positioned upright with the suction bell disposed below the surface of a body of liquid to be pumped. The rotation of the impeller generates a flow of the liquid upwardly through the passage between diffuser section 12 of the casing and the diffuser core 18, through the discharge conduit and discharge elbow. The diffuser vanes convert the diverging tangential flow from the impeller to an axial flow entering the discharge conduit. By virtue of the three diffuser vanes employed, there is little impediment to flow of solids through the diffuser section. The close spacing of the tubular shroud to the interior edges of the vanes 26, 34 within the discharge conduit and elbow effectively presents a unitary guide vane which prevents stringy materials from wrapping about the tubular shroud and impeding flow through the pump.

Figure 6:
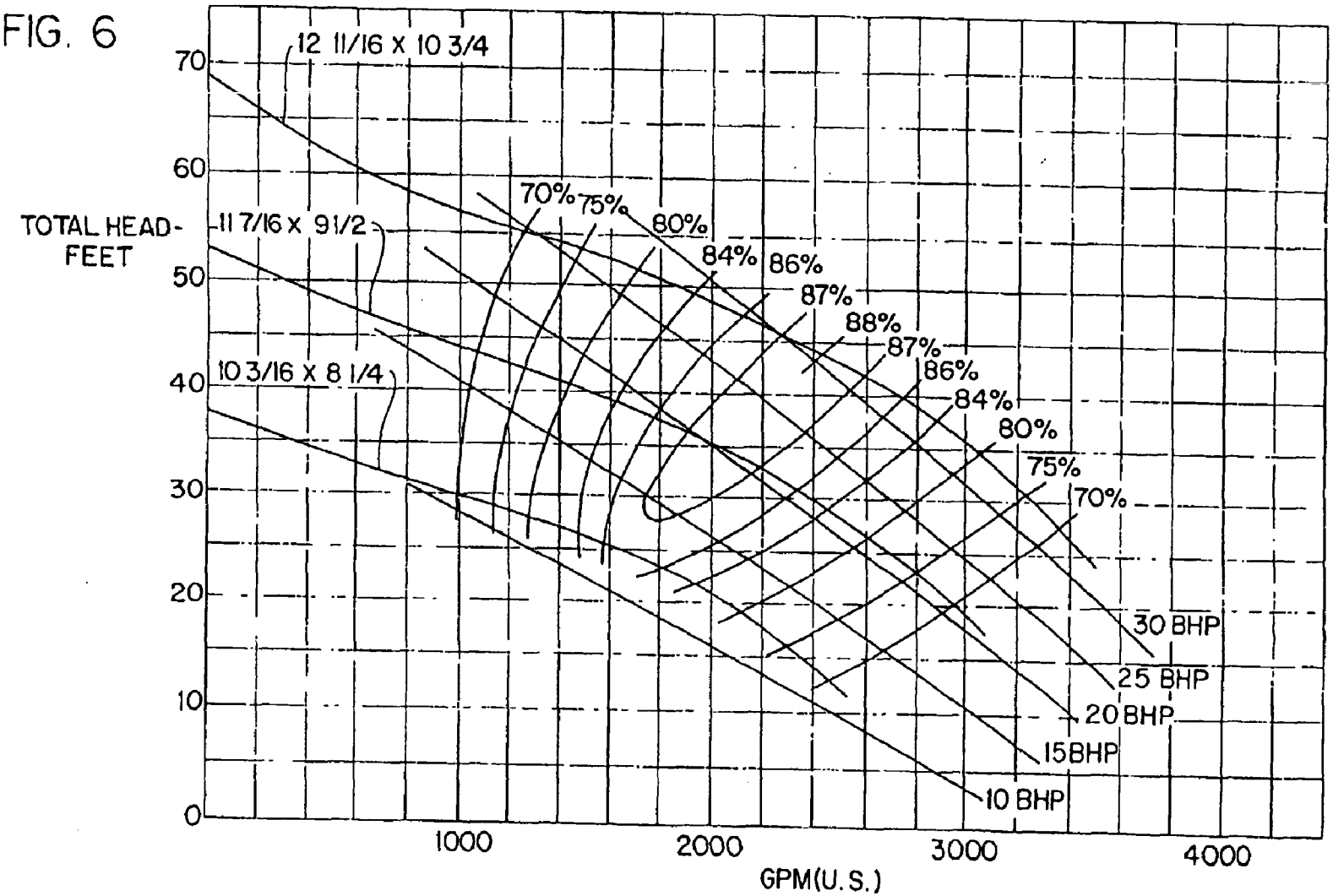
FIG. 6 is a graph illustrating the performance of a vertical turbine pump constructed according to the teachings of the present invention.

The vertical turbine pump of the present invention having three impeller vanes and three diffuser vanes achieves very favorable hydraulic performance, as shown in FIG. 6 by the head versus flow curves which slope downwardly from left to right and the iso-efficiency curves which are labelled with percentages. (The curves were obtained from testing of a pump having a twelve inch diffuser exit). This performance is not achieved by a similarly configured vertical turbine pump having two impeller vanes and two diffuser vanes. In addition, the vertical turbine pump of the present invention, configured with two or three impeller vanes and three diffuser vanes, generates less pronounced pressure pulsations and achieves noticeably smoother operation than a vertical turbine pump having two impeller vanes and two diffuser vanes.

Servicing the pump bowl bearings in the field is simple and straight forward. After removing the pump from its working location and supporting the pump horizontally, the suction bell is separated from the pump bowl casing, the impeller is removed from the end of the drive shaft, the retaining ring 70 within the lower formation 62 in the diffuser core is removed and the bearing cartridge is turned to disengage the threads 64 at the upper end of the tubular housing from the threads 66 in the tubular adapter; the bearing cartridge can then be removed through the lower end of the pump bowl casing and replaced with another bearing cartridge having new or reconditioned bearings. The use of a special tool having an end formation which mates with the formation at the lower end of the bearing cartridge facilitates turning of the bearing cartridge during removal and installation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vertical turbine pump comprising:

a pump bowl assembly including a casing having a bulbous diffuser section between axially opposed upstream and downstream sections which are narrower than said diffuser section;

a bulbous diffuser core disposed centrally in said casing diffuser section;

a drive shaft extending centrally and axially through said diffuser core;

a rotary impeller fastened to an end of said drive shaft and disposed in said casing upstream section adjacent a fluid inlet, said impeller incorporating flared shrouds which are axially spaced from each other and spirally oriented impeller vanes disposed between said shrouds and spaced from each other equiangularly about the axis of impeller rotation;

three stationary diffuser vanes spaced equiangularly about said diffuser core, said diffuser vanes extending laterally between said diffuser core and said casing and having upstream ends which curve about said diffuser core and downstream ends which extend generally axially through said casing downstream section; and a bearing cartridge separably fastened within said diffuser core, said bearing cartridge carrying axially spaced bearings which surround and rotatably support said drive shaft,

*said bearing cartridge being removable from an upstream section of said casing by removing said impeller and disengaging said bearing cartridge from said diffuser core thereby permitting said bearing cartridge to be slid off said drive shaft in an axial direction.*

2. A vertical turbine pump as recited in claim 1, wherein said impeller incorporates three equiangularly spaced impeller vanes.

3. A vertical turbine pump as recited in claim 1, wherein said impeller incorporates two equiangularly spaced impeller vanes.

4. A vertical turbine pump as recited in claim 1, wherein:

said bearing cartridge comprises a tubular housing surrounding said drive shaft, and said bearings are fixed within said tubular housing.

5. A vertical turbine pump as recited in claim 4, wherein:

said tubular housing is fastened within said diffuser core by a threaded coupling.

6. In a vertical turbine pump incorporating a pump bowl assembly including a casing having a bulbous diffuser section between axially opposed upstream and downstream sections which are narrower than said diffuser section, a bulbous diffuser core disposed centrally in said casing diffuser section, a drive shaft extending centrally and axially through said diffuser core and a rotary impeller fastened to an end of said drive shaft and disposed in said casing upstream section adjacent a fluid inlet, the improvement comprising:

a bearing cartridge separably fastened within said diffuser core;

said bearing cartridge carrying axially spaced bearings which surround and rotatably support said drive shaft,

*said bearing cartridge being removable from an upstream section of said casing by removing said impeller and disengaging said bearing cartridge from said casing thereby permitting said bearing cartridge to be slid off said drive shaft in an axial direction.*

7. In a vertical turbine pump as recited in claim 6, the improvement further comprising:

said bearing cartridge comprising a tubular housing surrounding said drive shaft, and said bearings being fixed within said tubular housing.

8. In a vertical turbine pump as recited in claim 7, the improvement further comprising:

said tubular housing being fastened within said diffuser core by a threaded coupling.

9. In a vertical pump as recited in claim 8, the improvement further comprising:

said threaded coupling comprising threads carried on said tubular housing.

10. In a vertical turbine pump as recited in claim 7, the improvement further comprising:

said tubular housing being fastened to a tubular adapter which surrounds said drive shaft and axially abuts an end surface of said diffuser core which faces downstream.

11. In a vertical turbine pump as recited in claim 10, the improvement further comprising:

said tubular housing being fastened to said tubular adapter by mating threads carried on said tubular adapter and on an end of said tubular housing.

12. In a vertical turbine pump as recited in claim 11, the improvement further comprising:

a formation provided on said end surface of said diffuser core which mates with a formation carried on an end surface of said tubular adapter to effect axial alignment and prevent relative rotation between said tubular adapter and said diffuser core.

13. In a vertical turbine pump as recited in claim 12, the improvement further comprising:

said mating formations comprising axially extending lugs.

14. In a vertical turbine pump as recited in claim 7, the improvement further comprising:

a formation provided on an end of said tubular housing adjacent to said impeller, said formation adapted to mate with a tool for facilitating the removal and installation of said tubular housing through said casing upstream section.

*15. A vertical turbine pump comprising:*

*a pump assembly including a casing;*

*a diffuser core disposed in said casing;*

*a drive shaft extending through said diffuser core;*

*a rotary impeller fastened to an upstream end of said drive shaft; and*

*a bearing cartridge including an elongated housing having a bearing disposed therein,*

*said bearing cartridge separably fastened to said diffuser core,*

*said bearing surrounding and rotatably supporting said drive shaft,*

*said bearing cartridge being removable from an upstream section of said casing by removing said impeller and disengaging said bearing cartridge from said diffuser core thereby permitting said bearing cartridge to be slid off said drive shaft in an axial direction.*

*16. The vertical turbine pump as recited in claim 15, wherein an only active element removed to allow removal of said bearing is said impeller, and wherein the term "active element" refers to an element that is actively rotated or otherwise actively moved by said drive shaft when the vertical turbine pump is on.*

*17. The vertical turbine pump as recited in claim 15, wherein said bearing cartridge includes an engagement structure integral thereon and said diffuser core includes a reciprocal engagement structure therein for receiving the engagement structure of said bearing cartridge.*

*18. The vertical turbine pump as recited in claim 15, wherein said bearing is a sleeve-type bearing.*

*19. An apparatus for facilitating servicing of a bearing from an upstream end of a vertical turbine pump incorporating a pump assembly including a casing, a diffuser core disposed in the casing, a drive shaft extending through the diffuser core, and a rotary impeller fastened to an upstream end of the drive shaft, the apparatus comprising:*

*a bearing cartridge including an elongated housing having the bearing disposed therein,*

*said bearing cartridge separably fastened to the diffuser core,*

*said bearing surrounding and rotatably supporting the drive shaft,*

*said bearing cartridge being removable from an upstream end of the casing by removing the impeller and disengaging said bearing cartridge from the diffuser core thereby permitting said bearing cartridge to be slid off the drive shaft in an axial direction.*

*20. The apparatus as recited in claim 19, wherein an only active element removed to allow removal of said bearing cartridge is the impeller, and wherein the term "active element" refers to an element that is actively rotated or otherwise actively moved by the drive shaft when the vertical turbine pump is on.*

*21. The apparatus as recited in claim 19, wherein said bearing cartridge includes an engagement structure integral therein and said diffuser core includes a reciprocal engagement structure thereon for receiving the engagement structure of said bearing cartridge.*

*22. In a vertical turbine pump incorporating a pump bowl assembly including a casing having a bulbous diffuser section between axially opposed upstream and downstream sections which are narrower than said diffuser section, a bulbous diffuser core disposed centrally in said casing diffuser section, a drive shaft extending centrally and axially through said diffuser core and a rotary impeller fastened to an end of said drive shaft and disposed in said casing upstream section adjacent a fluid inlet, the improvement comprising:*

*a bearing cartridge separately fastened within said diffuser core;*

*said bearing cartridge carrying axially spaced bearings which surround and rotatably support said drive shaft,*

*said bearing cartridge comprising a tubular housing surrounding said drive shaft, and said bearings being fixed within said tubular housing,*

*said tubular housing being fastened to a tubular adapter which surrounds said drive shaft and axially abuts an end surface of said diffuser core which faces downstream.*

* * * * *